US009387424B2

United States Patent
Antony et al.

(10) Patent No.: US 9,387,424 B2
(45) Date of Patent: *Jul. 12, 2016

(54) V-SHAPED FILTER AND FIXTURE

(71) Applicant: CUMMINS FILTRATION IP, INC., Minneapolis, MN (US)

(72) Inventors: Budi Antony, Fitchburg, WI (US); Mark V. Holzmann, Stoughton, WI (US); Scott W. Schwartz, Cottage Grove, WI (US)

(73) Assignee: Cummins Filtration IP Inc., Columbus, IN (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/317,020

(22) Filed: Jun. 27, 2014

(65) Prior Publication Data

US 2014/0305087 A1    Oct. 16, 2014

Related U.S. Application Data

(63) Continuation of application No. 13/223,387, filed on Sep. 1, 2011, now Pat. No. 8,764,870.

(60) Provisional application No. 61/383,419, filed on Sep. 16, 2010, provisional application No. 61/494,503, filed on Jun. 8, 2011.

(51) Int. Cl.
*B01D 46/12* (2006.01)
*B01D 46/00* (2006.01)
*B01D 29/05* (2006.01)
*B01D 46/42* (2006.01)

(52) U.S. Cl.
CPC .............. *B01D 46/125* (2013.01); *B01D 29/05* (2013.01); *B01D 46/002* (2013.01); *B01D 46/0002* (2013.01); *B01D 46/4227* (2013.01); *B01D 2265/06* (2013.01)

(58) Field of Classification Search
CPC ............. B01D 46/0002; B01D 46/002; B01D 46/125; B01D 46/4227; B01D 2265/06; B01D 2277/20; B01D 46/0005; B01D 29/05
See application file for complete search history.

(56) References Cited

U.S. PATENT DOCUMENTS

| | | |
|---|---|---|
| 2,626,010 A | 1/1953 | Sebok |
| 4,207,085 A | 6/1980 | Clifton |
| 4,440,555 A | 4/1984 | Chichester |
| 4,882,055 A | 11/1989 | Stamstad |
| 5,474,337 A | 12/1995 | Nepsund et al. |
| 6,375,700 B1 | 4/2002 | Jaroszczyk et al. |
| 6,485,538 B1 | 11/2002 | Toyoshima |
| 6,846,342 B2 | 1/2005 | Mertz et al. |

(Continued)

FOREIGN PATENT DOCUMENTS

| | | |
|---|---|---|
| CN | 101424233 A | 5/2009 |
| CN | 201193576 Y | 11/2009 |

OTHER PUBLICATIONS

Office Action issued in Chinese Patent Application No. 201180037022.X, dated Dec. 26, 2014.

*Primary Examiner* — Robert Clemente

(74) *Attorney, Agent, or Firm* — Foley & Lardner LLP

(57) ABSTRACT

A V-shaped filter includes a pair of filter media panel elements having respective root ends and diverging therefrom to distal ends in a V-shape. A single unitarily molded fixture is provided, securing the pair of filter media panel elements in the V-shape.

20 Claims, 9 Drawing Sheets

(56) References Cited

U.S. PATENT DOCUMENTS

| | | |
|---|---|---|
| 6,955,696 B1 | 10/2005 | Ost et al. |
| 7,588,629 B2 | 9/2009 | Osborne et al. |
| 7,597,735 B2 | 10/2009 | Terres et al. |
| 7,691,165 B1 | 4/2010 | Hammes |
| 7,740,678 B2 | 6/2010 | Gunderson et al. |
| 8,535,403 B2 | 9/2013 | Patwardhan et al. |
| 8,764,870 B2 * | 7/2014 | Antony ............... B01D 46/125 55/357 |
| 2007/0204579 A1 | 9/2007 | Karlsson et al. |
| 2008/0011673 A1 | 1/2008 | Janikowski et al. |
| 2008/0040883 A1 | 2/2008 | Beskow et al. |
| 2009/0193773 A1 | 8/2009 | Sundvik et al. |
| 2010/0126128 A1 | 5/2010 | Scott, III |

\* cited by examiner

V-SHAPED FILTER AND FIXTURE

CROSS-REFERENCE TO RELATED APPLICATIONS

This application is a continuation of U.S. patent application Ser. No. 13/223,387, filed Sep. 1, 2011. U.S. patent application Ser. No. 13/223,387 claims the benefit of and priority from U.S. Provisional Patent Application No. 61/383,419 filed Sep. 16, 2010, and U.S. Provisional Patent Application No. 61/494,503, filed Jun. 8, 2011. All of these applications are incorporated herein by reference in their entirety.

Commonly owned U.S. patent application Ser. No. 13/229,835, filed Sep. 12, 2011, now U.S. Pat. No. 8,535,403, also claims priority from the noted provisional applications.

BACKGROUND AND SUMMARY

The invention relates to V-shaped filters.

V-shaped filters are known in the prior art, including a pair of filter media panel elements having respective root ends and diverging therefrom to distal ends in a V-shape.

The present disclosure arose during continuing development efforts in the above technology.

DETAILED DESCRIPTION

Figure 1:
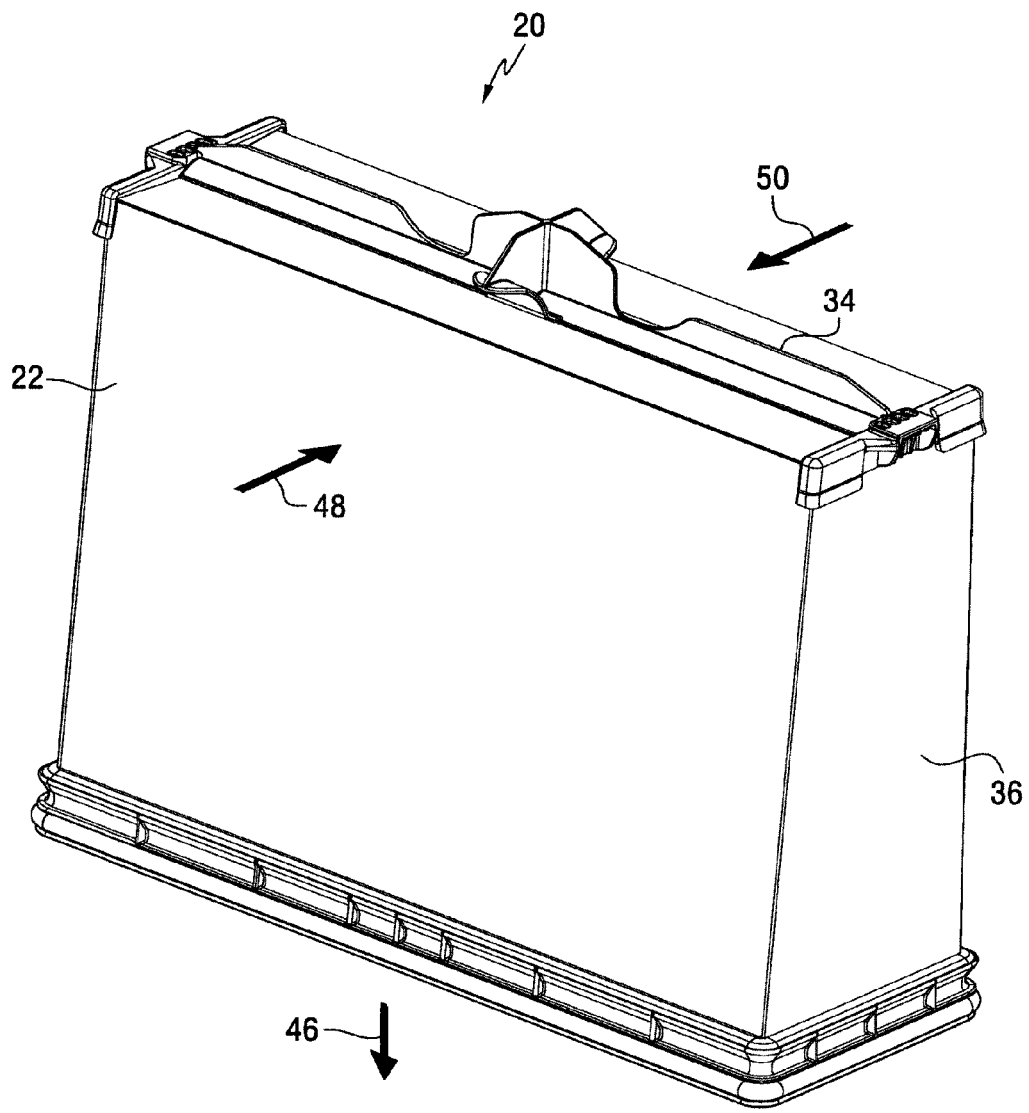
FIG. 1 is a perspective view showing a V-shaped filter known in the prior art.
Figure 2:
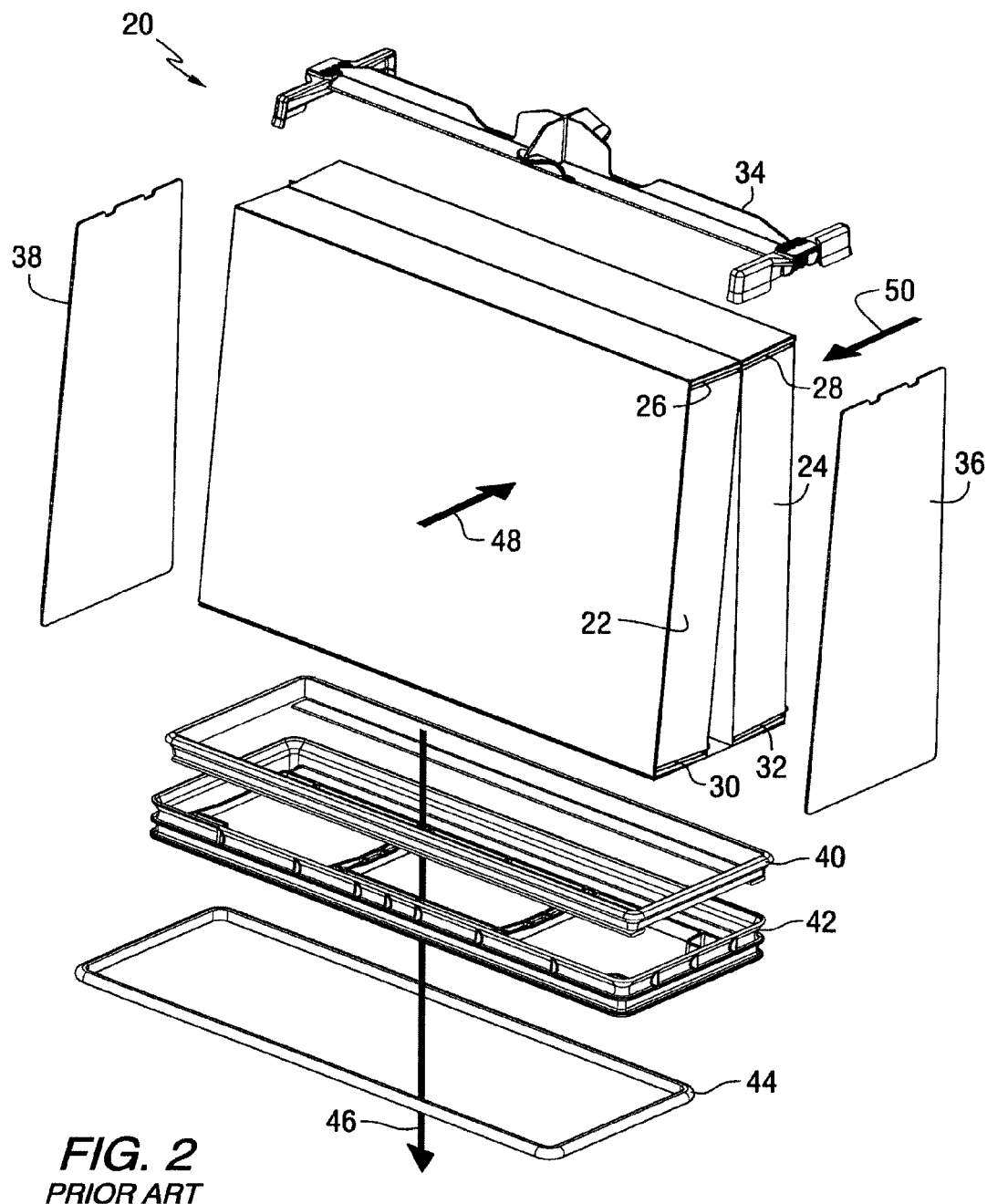
FIG. 2 is an exploded perspective view of the filter of FIG. 1.

FIGS. 1, 2 show a V-shaped filter 20 known in the prior art. A pair of filter media panel elements 22, 24 have respective facing root ends 26, 28 and diverging therefrom to distal ends 30, 32 in a V-shape. A multi-part frame, e.g. as provided by a top 34, sides 36, 38, and base components 40, 42, 44, holds the V-shaped filter in assembled condition, and provides sealing, etc. The fluid to be filtered may flow outside-in, e.g. inwardly through the filter media panel elements to be filtered thereby as shown at arrows 48, 50, then discharged as clean filtered fluid into the V-shaped space between filter media panel elements 22, 24, then discharged as shown at arrow 46 downwardly in the orientation of FIGS. 1, 2. In an alternate embodiment, the fluid to be filtered may flow inside-out, e.g. upwardly in the orientation of FIGS. 1, 2, oppositely to the direction of arrow 46, into the V-shaped space between filter media panel elements 22, 24, then outwardly through such filter media panel elements to be filtered thereby and then discharged as clean filtered fluid, oppositely to the direction of arrows 48, 50.

FIGS. 3-11 illustrate the present disclosure and use like reference numerals from above where appropriate to facilitate understanding.

Figure 3:
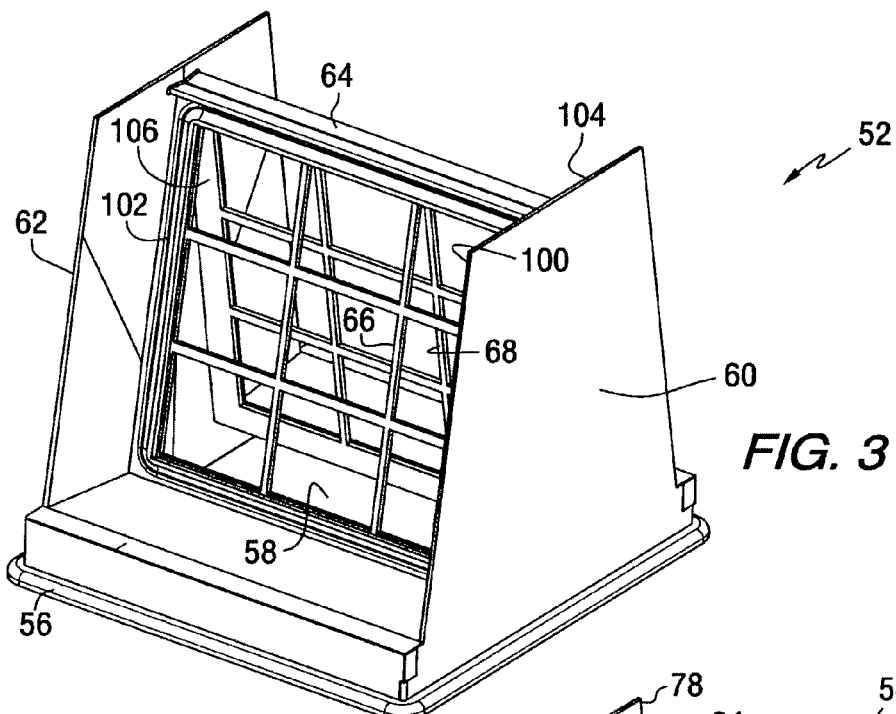
FIG. 3 is a perspective view of a fixture in accordance with the present disclosure.
Figure 5:
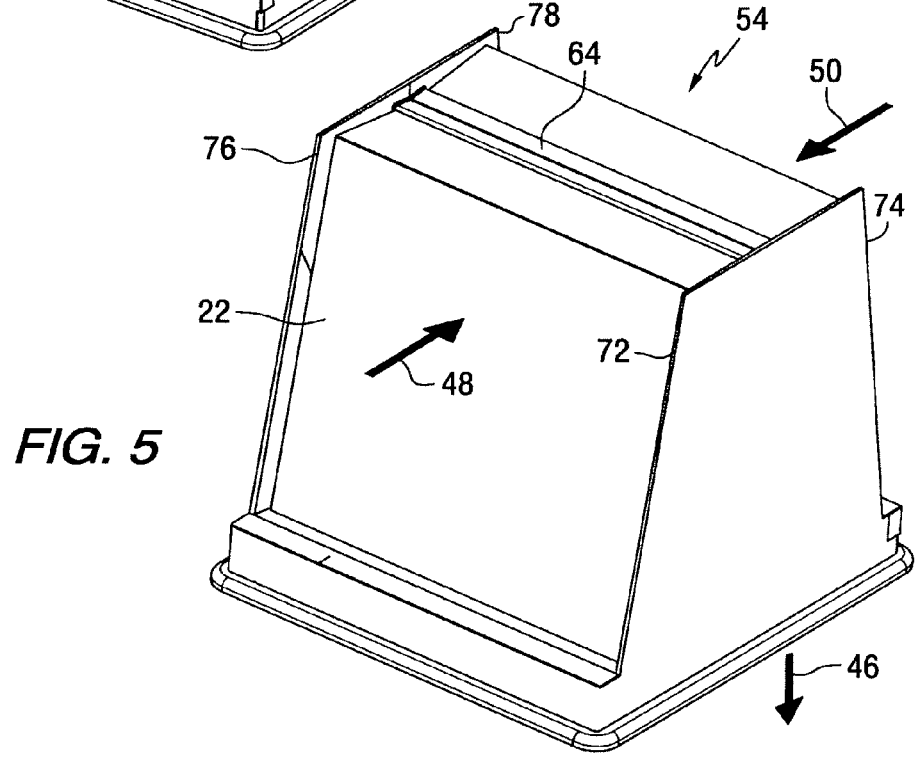
FIG. 5 is a perspective assembly view of the V-shaped filter of FIG. 4.
Figure 4:
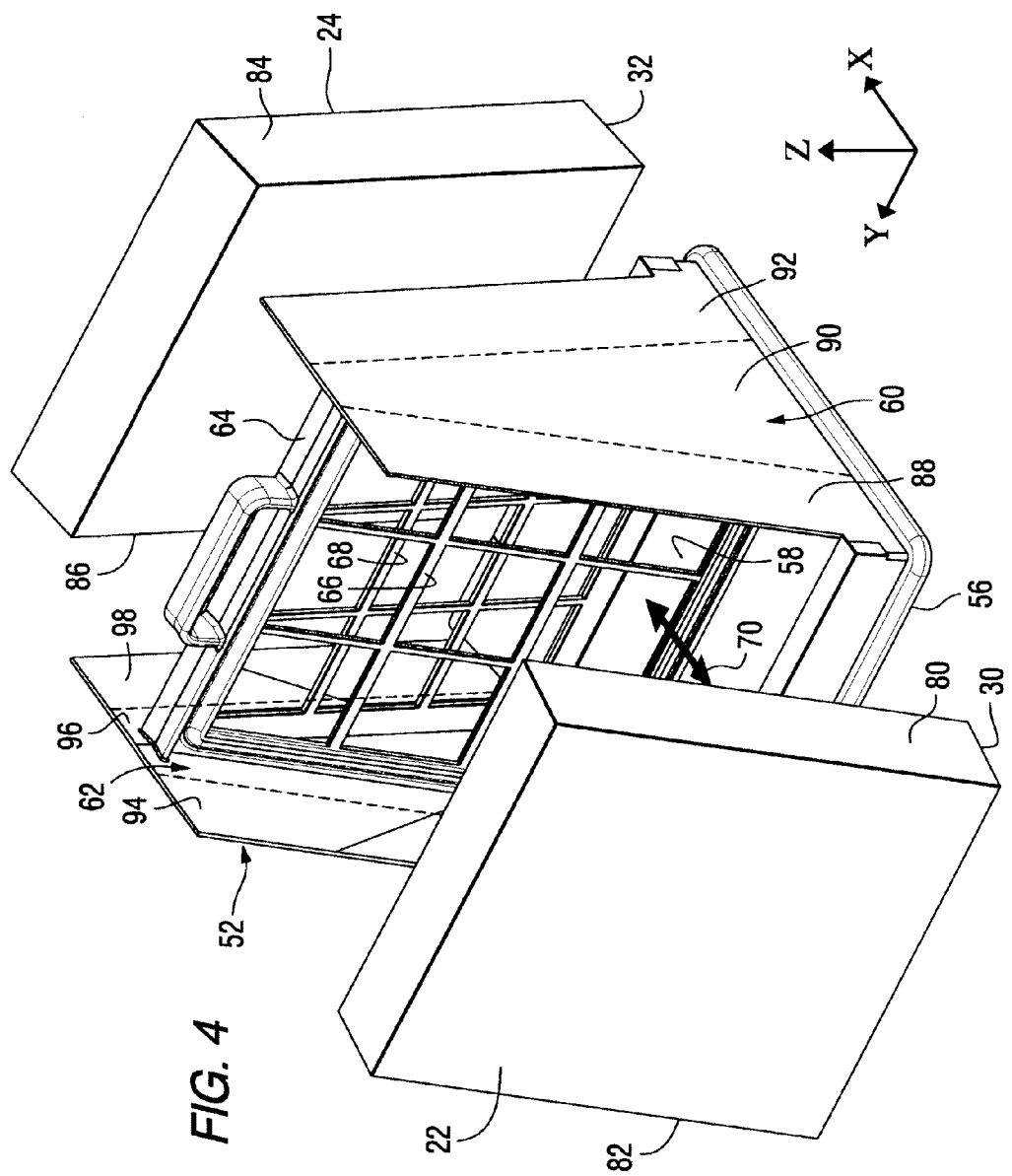
FIG. 4 is an exploded perspective view of a V-shaped filter using the fixture of FIG. 3.

FIG. 3 shows a single unitarily molded fixture 52 securing the pair of filter media panel elements 22, 24, FIG. 4, in a V-shape in an assembled V-shaped filter 54, FIG. 5. Fixture 52 is a one-piece integral member. The fixture lies in a coordinate system having X, Y and Z axes orthogonal to each other, FIG. 4. The fixture has a base portion 56 at distal ends 30, 32 of the filter media panel elements. Base portion 56 lies in the X-Y plane and has a central opening 58 passing fluid therethrough in the Z-direction, e.g. upwardly in the orientation of FIGS. 4, 5. The fixture has a pair of endwall portions 60, 62 spaced from each other along the Y-direction. Each endwall portion 60, 62 extends in the Z-direction from base portion 56. Each endwall portion 60, 62 lies in the X-Z plane. First filter media panel element 22 lies in a first oblique plane oblique to each of the X-Y and Y-Z planes. Second filter media panel element 24 lies in a second oblique plane oblique to each of the X-Y and Y-Z planes. The noted first and second oblique planes intersect at an intersection line 64 extending in the Y-direction. Fixture 52 has a first lattice-work portion 66 through which fluid flows. First lattice-work portion 66 lies in the noted first oblique plane and extends from base portion 56 towards intersection line 64. Fixture 52 has a second lattice-work portion 68 through which fluid flows. Second lattice-work portion 68 lies in the noted second oblique plane and extends from base portion 56 towards intersection line 64.

First and second lattice-work portions 66 and 68 are spaced from each other by a gap 70, FIG. 4, having a width spanning along the X-direction. The gap width varies from a maximum at base portion 56 and narrows to lesser widths as the gap 70 extends away from base portion 56. First and second lattice-work portions 66 and 68 have respective inner faces facing each other across gap 70, and have respective oppositely facing outer faces facing away from gap 70. One of the inner and outer faces supports a respective filter media panel element 22, 24. In the disclosed embodiment, the outer faces of the lattice-work portions support the filter media panel elements. First and second endwall portions 60 and 62 have outer edges, e.g. as shown at 72, 74, 76, 78, FIG. 5, extending beyond the respective filter media panel element 22, 24 to provide an outer profile encompassing the pair of filter media panel elements recessed inwardly of the noted outer edges 72, 74, 76, 78, to protect the pair of filter media panel elements 22, 24 including during installation, removal, and cleaning thereof.

First filter media panel element 22 has a first border 80, FIG. 4, engaging first endwall portion 60 of fixture 52, and a second border 82 engaging second endwall portion 62 of filter 52. Second filter media panel element 24 has a first border 84 engaging first endwall portion 60, and a second border 86 engaging second endwall portion 62. First endwall portion 60 has a first section 88 at first border 80 of first filter media panel element 22, a second section 90 spanning gap 70, and a third section 92 at first border 84 of second filter media panel element 24. The noted sections 88, 90, 92 are demarcated by the dashed lines added to FIG. 4, but are one continuous endwall. Second endwall portion 62 has a first section 94 at second border 82 of first filter media panel element 22, a second section 96 spanning gap 70, and a third section 98 at second border 86 of second filter media panel element 24. The noted sections 94, 96, 98 are demarcated by dashed lines added to FIG. 4, but are a continuous endwall. Fixture 52 has a first adhesive engagement surface, e.g. a trough, a ledge, or other surface, 100 extending along first section 88 of first endwall portion 60, a second adhesive engagement surface 102 extending along first section 94 of second endwall portion 62, a third adhesive engagement surface 104 extending along third section 92 of first endwall portion 60, and a fourth adhesive engagement surface 106 extending along third section 98 of second endwall portion 62. In one embodiment, first section 88 of first endwall portion 60 has a rhomboid shape, second section 90 of first endwall portion 60 has a triangular shape, third section 92 of first endwall portion 60 has a rhomboid shape, first section 94 of second endwall portion 62 has a rhomboid shape, second section 96 of second endwall portion 62 has a triangular shape, and third section 98 of second endwall portion 62 has a rhomboid shape. The noted triangular shape may be apex-triangular, or frusto-triangular as shown. In one embodiment, first endwall portion 60, including first, second and third sections 88, 90, 92 thereof in combination, has a trapezoidal shape with exactly one pair of parallel sides, e.g. the upper and lower sides in the orientation of FIG. 4. In this embodiment, second endwall portion 62, including first, second and third sections 94, 96, 98 thereof in combination, has a trapezoidal shape with exactly one pair of parallel sides, e.g. the upper and lower sides in the orientation of FIG. 4. In one embodiment, first endwall portion 60, including first, second, and third sections 88, 90, 92 thereof in combination, has a frusto-triangular shape. In this embodiment, second endwall portion 62, including first, second, and third sections 94, 96, 98 thereof in combination, has a frusto-triangular shape. The pair of filter media panel elements 22, 24 may comprise pleated filter media elements having pleats spaced from each other along the Y-direction and having pleat ends at base portion 56 and at the top of the filter, wherein the pleat ends are alternately sealed to each other, as is known, for example U.S. Pat. No. 6,375,700, U.S. Patent Application Publication No. U.S. 2008/0011673, both incorporated herein by reference. In another embodiment, the pleat ends are continuously sealed. In a further embodiment, the pleats are spaced from each other along the Z-direction. In other embodiments, the filter media panel elements may comprise pleated or nonpleated media, fibrous media, woven or nonwoven media, mesh, foam, melt blown depth media, or other filter media.

Figure 6:
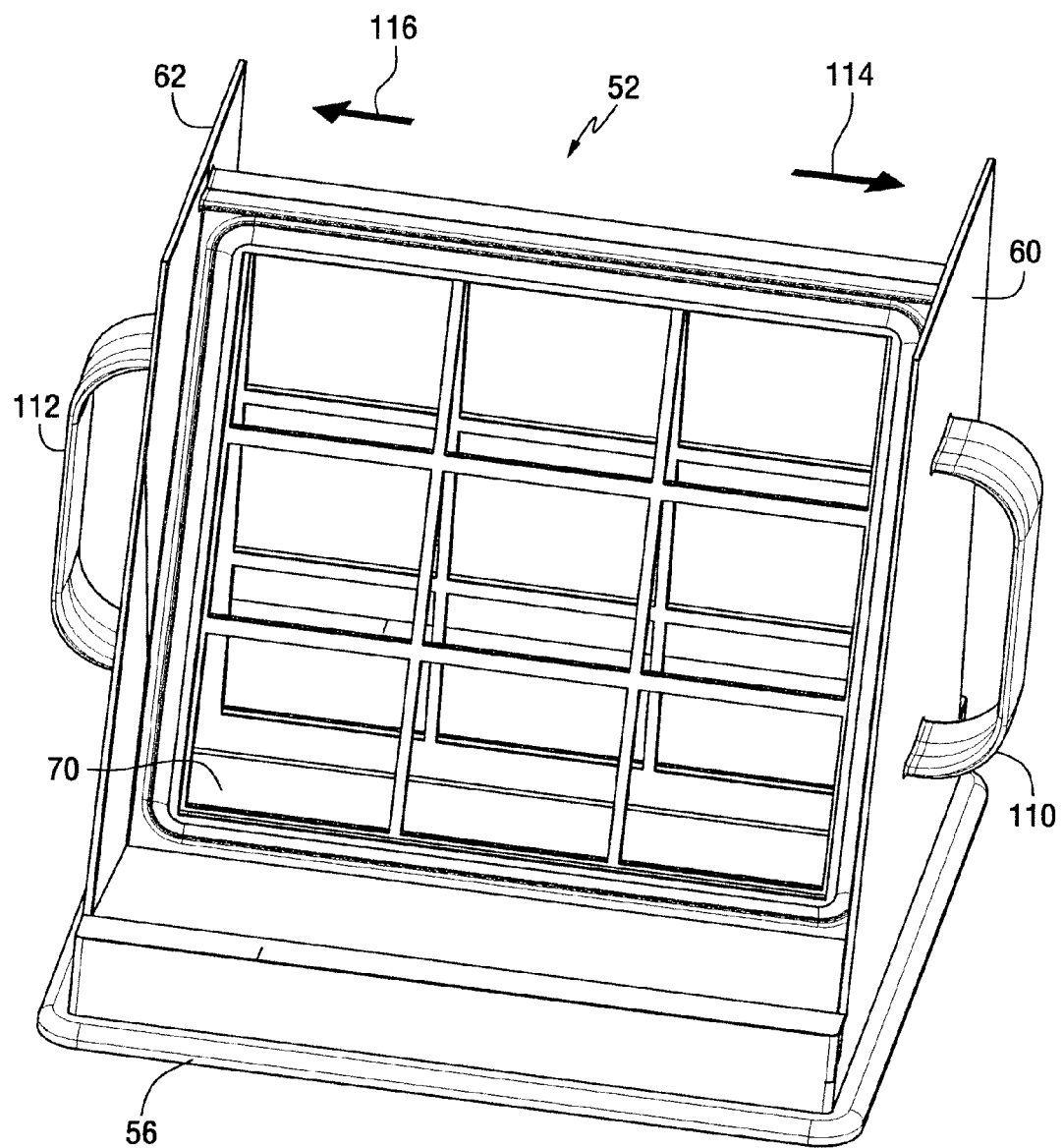
FIG. 6 is like FIG. 3 and shows another embodiment.
Figure 7:
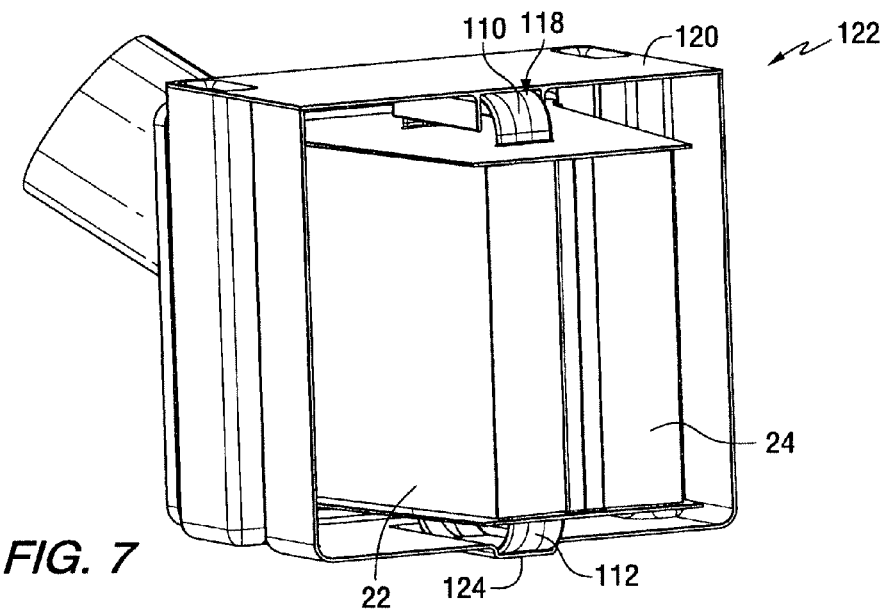
FIG. 7 is a perspective view showing a V-shaped filter using the fixture of FIG. 6 mounted in a housing.
Figure 8:
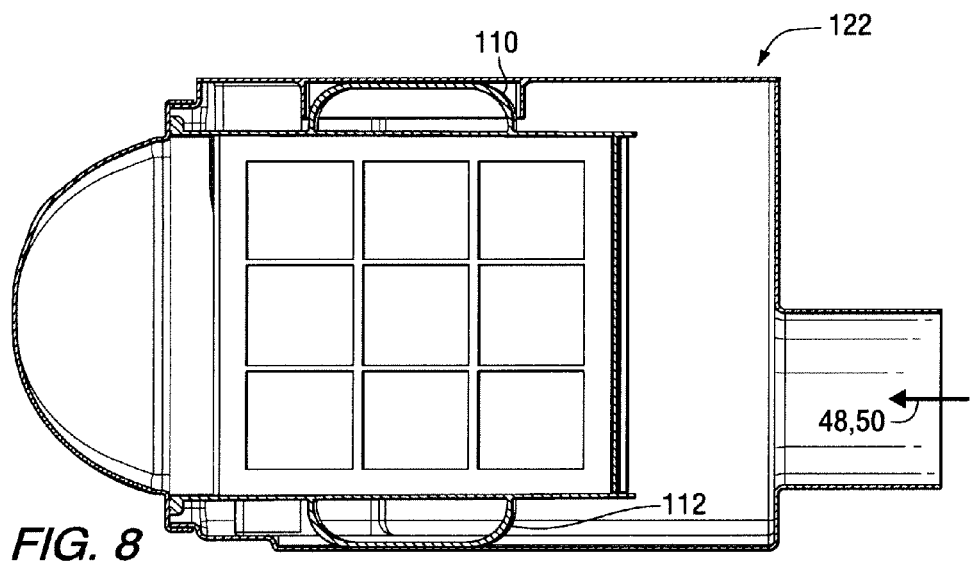
FIG. 8 is another view of the construction of FIG. 7.

FIGS. 6-8 show a further embodiment and use like reference numerals from above where appropriate to facilitate understanding. First endwall portion 60 of fixture 52 has a first handle 110 extending outwardly therefrom oppositely from gap 70. Second endwall portion 62 of the fixture has a second handle 112 extending outwardly therefrom oppositely from gap 70. First handle 110 extends from first endwall portion 60 in a first Y-direction 114. Second handle 112 extends from second endwall portion 62 in a second opposite Y-direction 116. The handles allow the user/technician to easily grip the filter with both hands without touching and potentially damaging the filter media during cleaning. The ability to easily and safely clean the filter element without damaging the media is desirable for customers operating in high dust environments. One of the handles can mate into a recessed cup such as 118 on a service door or cover 120 of a housing 122 to fix the filter in the housing, while the other handle can act as an alignment feature by mating to a channel such as 124 on the housing, thus reducing to one degree of freedom. The latter handle such as 112 can also provide a leveling feature to prevent the filter element from tipping when it is initially inserted into the housing. A properly leveled element eases the insertion of sealing fork tines, to be described, and creates a uniform compression of a sealing gasket, to be described. The handles can be of various shapes and may be located on the endwall portions and/or the top of the fixture and/or the bottom of the fixture, depending upon the service door orientation.

Figure 9:
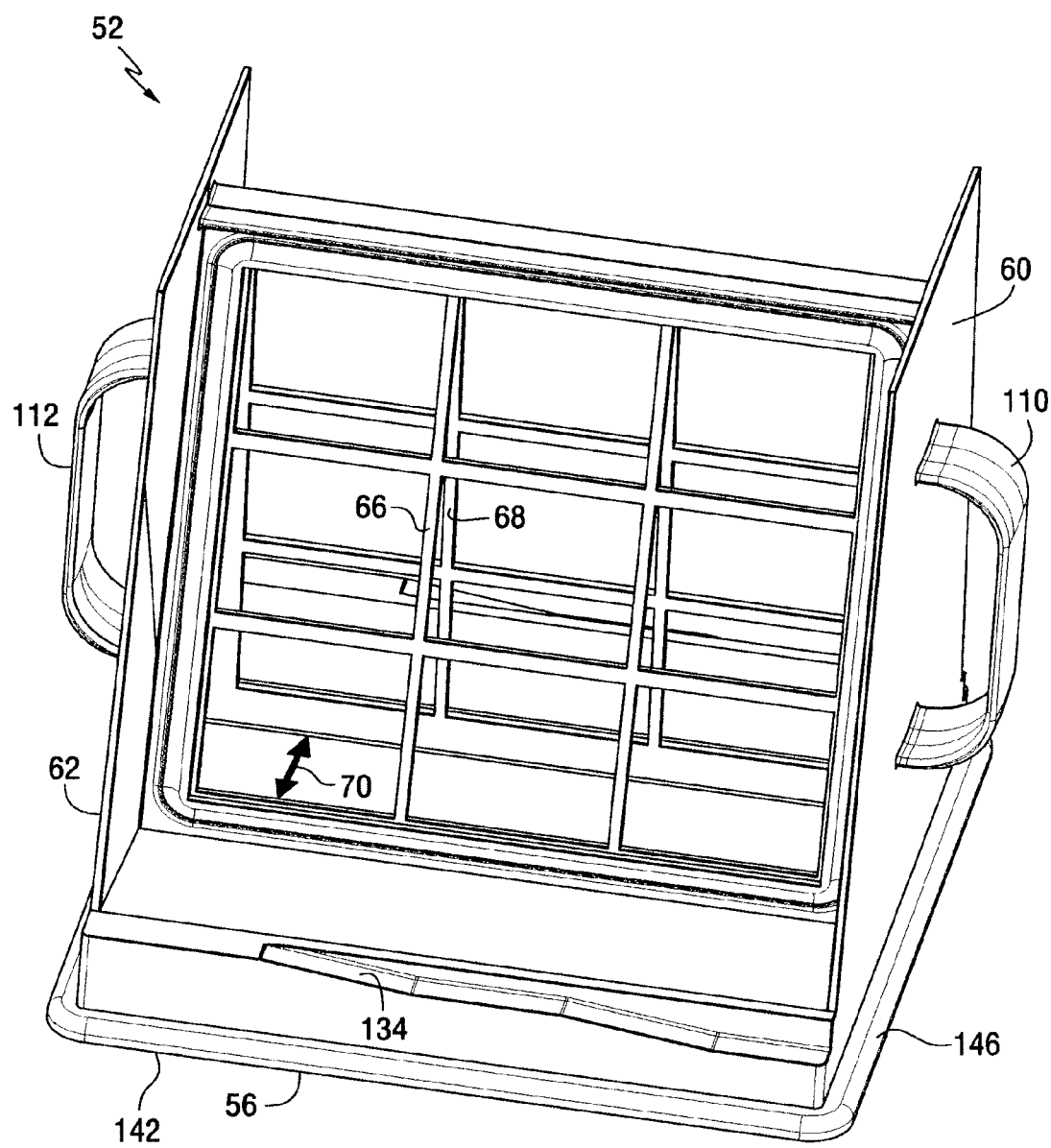
FIG. 9 is like FIG. 6 and shows a further embodiment.
Figure 10:
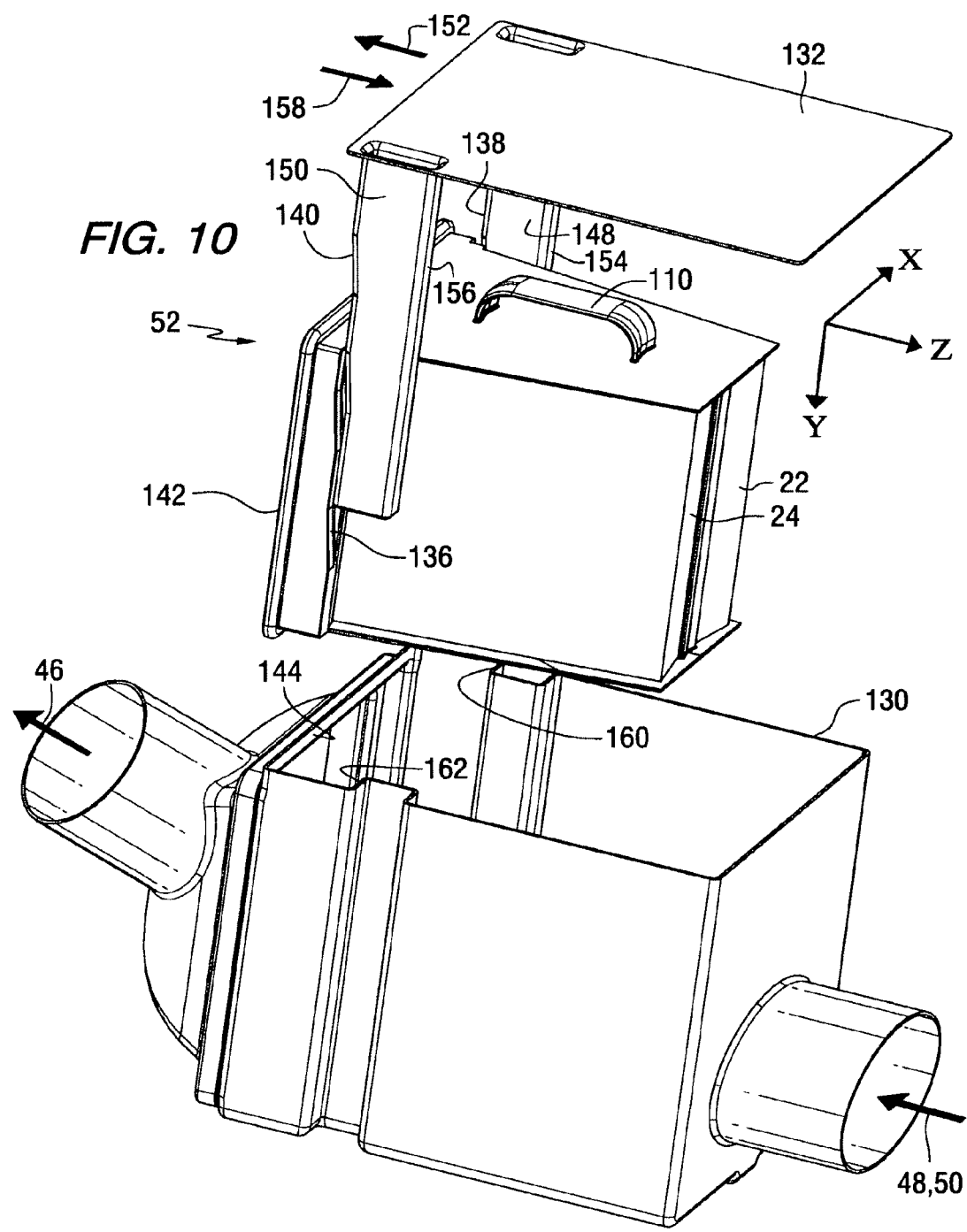
FIG. 10 is an exploded perspective view showing a V-shaped filter using the fixture of FIG. 9 and mounted in a housing.
Figure 11:
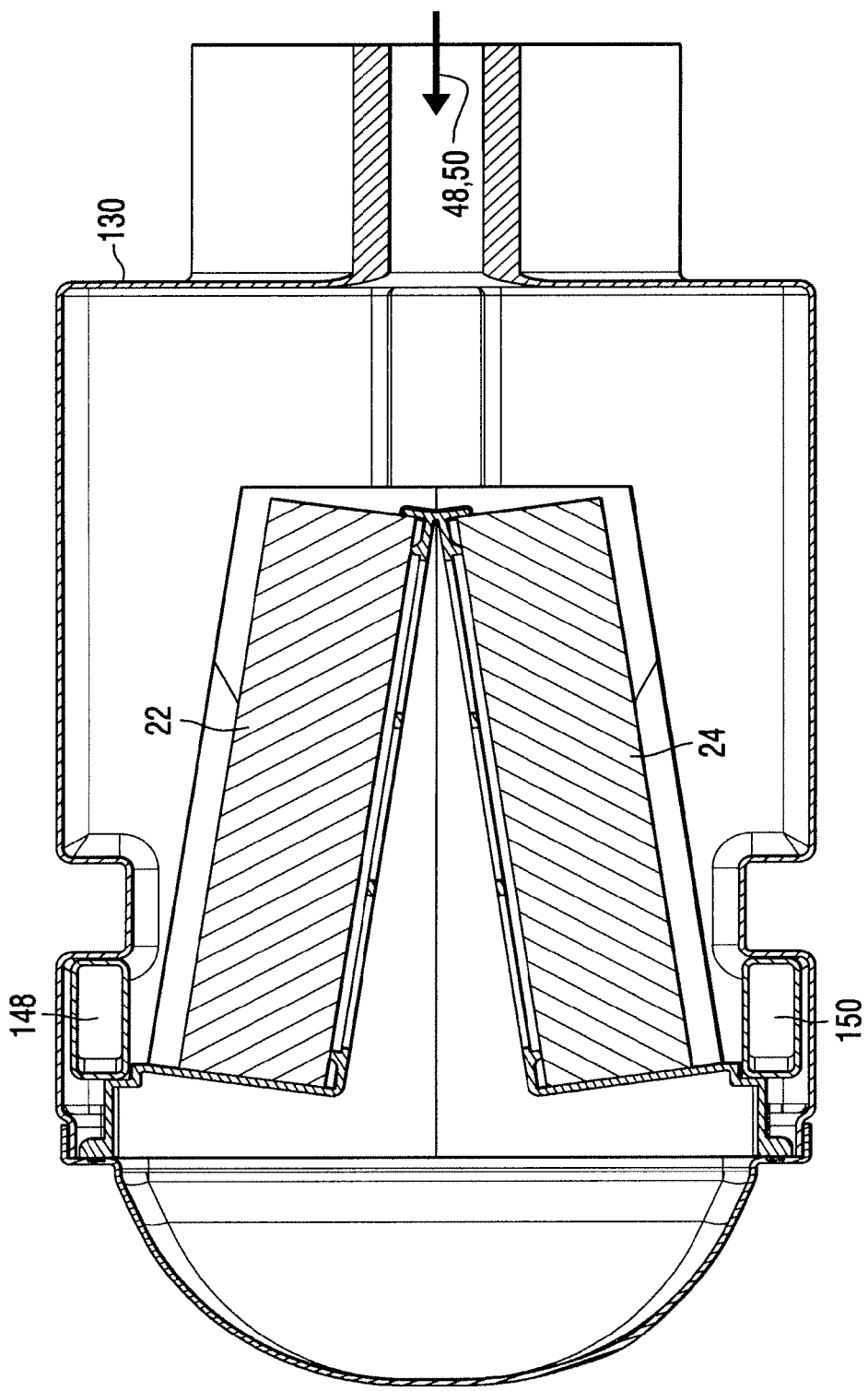
FIG. 11 is a perspective view illustrating the construction of FIG. 10.

FIGS. 9-11 show a further embodiment and use like reference numerals from above where appropriate to facilitate understanding. Fixture 52 and the pair of filter media panel elements 22, 24 are housed in a housing 130 having a service door 132. At least one of base portion 56 of fixture 52, housing 130, and service door 132 has one or more ramped interface surfaces 134, 136, 138, 140, to be described, forcing pressed sealing engagement of fixture 52 in housing 130. In one embodiment, base portion 56 of the fixture and an inlet portion of the housing 130 have respective sealing surfaces 142, 144 engaging each other in sealing relation, which may include a gasket such as 146. Each of ramped interface surfaces 134 and 136 on base portion 56 of fixture 52 is separate and spaced from sealing surface 142 on base portion 56 of fixture 52. Each of ramped interface surfaces 134 and 136 on base portion 56 of fixture 52 is spaced from sealing surface 142 on base portion 56 of fixture 52 along the noted Z-direction. Service door 132 includes at least one and in the disclosed embodiment two fork tines 148, 150 extending therefrom and having respective designated ramped interface surfaces 138, 140 thereon facing in a first Z-direction 152 toward base portion 56 of fixture 52. The fork tines 148, 150 each have a distally opposite stop surface 154, 156 facing in a second opposite Z-direction 158. Housing 130 has at least one and in the disclosed embodiment two shoulder surfaces 160, 162 facing in the first Z-direction 152 towards and engaging respective stop surfaces 154, 156 on respective fork tines 148, 150. The ramped interface surfaces 134, 136 on base portion 56 of fixture 52 face in the second Z-direction 158 and are engaged by respective designated ramped interface surfaces 138, 140 on respective fork tines 148, 150. Shoulder surfaces 160, 162 apply sealing force along the Z-direction through fork tines 148, 150 and base portion 56 of fixture 52 to sealing surfaces 142, 144 including sealing gasket 146 if used.

The disclosure provides a V-shaped filter for filtering fluid, which may be gas, such as air, or liquid. The disclosure also provides a fixture for a V-shaped filter.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A V-shaped filter for filtering fluid, comprising a pair of filter media panel elements having respective facing root ends and diverging therefrom to distal ends in a V-shape, and a single unitarily molded fixture securing said pair of filter media panel elements in said V-shape, wherein said fixture lies in a coordinate system having X, Y and Z axes orthogonal to each other, said fixture has a base portion at said distal ends of said filter media panel elements, said base portion having a central opening passing fluid therethrough, said fixture has a pair of endwall portions spaced from each other along the Y-direction, each said endwall portion extending in the Z-direction from said base portion, each said endwall portion lying in an X-Z plane, a first of said filter media panel elements lying in a first oblique plane oblique to each of an X-Y plane and a Y-Z plane, a second of said filter media panel elements lying in a second oblique plane oblique to each of the X-Y and Y-Z planes, said first and second oblique planes intersecting at an intersection line extending in the Y-direction, said fixture has a first lattice-work portion through which fluid flows, said first lattice-work portion lying in said first oblique plane and extending from said base portion towards said intersection line, said fixture has a second lattice-work portion through which fluid flows, said second lattice-work portion lying in said second oblique plane and extending from said base portion towards said intersection line.

2. The V-shaped filter of claim 1, wherein the fluid passes through the central opening in the Z-direction.

3. The V-shaped filter according to claim 1 wherein said fixture is a one-piece integral member.

4. The V-shaped filter according to claim 1 wherein said first and second lattice-work portions are spaced from each other by a gap having a width spanning along the X-direction, the gap width varying from a maximum at said base portion and narrowing to lesser widths as the gap extends away from said base portion.

5. The V-shaped filter according to claim 4 wherein said first and second lattice-work portions have respective inner faces facing each other across said gap, and have respective oppositely facing outer faces facing away from said gap, one of said inner and outer faces supporting a respective said filter media panel element.

6. The V-shaped filter according to claim 5 wherein said first and second endwall portions have outer edges extending beyond the respective filter media panel element to provide an outer profile encompassing said pair of filter media panel elements recessed inwardly of said outer edges, to protect said pair of filter media panel elements including during installation, removal, and cleaning thereof.

7. The V-shaped filter according to claim 5 wherein:
said first filter media panel element has a first border engaging said first endwall portion, and a second border engaging said second endwall portion;
said second filter media panel element has a first border engaging said first endwall portion, and a second border engaging said second endwall portion;
said first endwall portion has a first section at said first border of said first filter media panel element, a second section spanning said gap, and a third section at said first border of said second filter media panel element;
said second endwall portion has a first section at said second border of said first filter media panel element, a second section spanning said gap, and a third section at said second border of said second filter media panel element.

8. The V-shaped filter according to claim 7 wherein:
said fixture has:
a first adhesive engagement surface extending along said first section of said first endwall portion;
a second adhesive engagement surface extending along said first section of said second endwall portion;
a third adhesive engagement surface extending along said third section of said first endwall portion;
a fourth adhesive engagement surface extending along said third section of said second endwall portion.

9. The V-shaped filter according to claim 7 wherein:
said first section of said first endwall portion has a rhomboid shape;
said second section of said first endwall portion has a triangular shape;
said third section of said first endwall portion has a rhomboid shape;
said first section of said second endwall portion has a rhomboid shape;
said second section of said second endwall portion has a triangular shape;
said third section of said second endwall portion has a rhomboid shape.

10. The V-shaped filter according to claim 9 wherein:
said first endwall portion, including said first, second, and third sections thereof in combination, has a trapezoidal shape with exactly one pair of parallel sides;
said second endwall portion, including said first, second, and third sections thereof in combination, has a trapezoidal shape with exactly one pair of parallel sides.

11. The V-shaped filter according to claim 10 wherein:
said first endwall portion, including said first, second, and third sections thereof in combination, has a frusto-triangular shape;
said second endwall portion, including said first, second, and third sections thereof in combination, has a frusto-triangular shape.

12. The V-shaped filter according to claim 1 wherein:
said first endwall portion has a first handle extending outwardly therefrom oppositely from said gap;
said second endwall portion has a second handle extending outwardly therefrom oppositely from said gap.

13. The V-shaped filter according to claim 12 wherein:
said first handle extends from said first endwall portion in a first Y-direction;
said second handle extends from said second endwall portion in a second opposite Y-direction.

14. The V-shaped filter according to claim 1 wherein:
said fixture and said pair of filter media panel elements are housed in a housing having a service door;
at least one of said base portion of said fixture, said housing, and said service door has one or more ramped interface surfaces forcing pressed sealing engagement of said fixture in said housing.

15. A fixture for a V-shaped filter for filtering fluid, said V-shaped filter having a pair of filter media panel elements having respective facing root ends and diverging therefrom to distal ends in a V-shape, said fixture being a unitarily molded fixture securing said pair of filter media panel elements in said V-shape,
wherein said fixture is a one-piece integral member and lies in a coordinate system having X, Y and Z axes orthogonal to each other, said fixture has a base portion at said distal ends of said filter media panel elements, said base portion having a central opening passing fluid therethrough, said fixture has a pair of endwall portions spaced from each other along the Y-direction, each said endwall portion extending in the Z-direction from said base portion, each said endwall portion lying in an X-Z plane, a first of said filter media panel elements lying in a first oblique plane oblique to each of an X-Y plane and a Y-Z plane, a second of said filter media panel elements lying in a second oblique plane oblique to each of the X-Y and Y-Z planes, said first and second oblique planes intersecting at an intersection line extending in the Y-direction, said fixture has a first lattice-work portion through which fluid flows, said first lattice-work portion lying in said first oblique plane and extending from said base portion towards said intersection line, said fixture has a second lattice-work portion through which fluid flows, said second lattice-work portion lying in said second oblique plane and extending from said base portion towards said intersection line.

16. The fixture of claim 15, wherein the fluid passes through the central opening in the Z-direction.

17. The fixture according to claim 15 wherein said first and second lattice-work portions are spaced from each other by a gap having a width spanning along the X-direction, the gap width varying from a maximum at said base portion and narrowing to lesser widths as the gap extends away from said base portion.

18. The fixture according to claim 17 wherein:
said first filter media panel element has a first border engaging said first endwall portion, and a second border engaging said second endwall portion;
said second filter media panel element has a first border engaging said first endwall portion, and a second border engaging said second endwall portion;
said first endwall portion has a first section at said first border of said first filter media panel element, a second section spanning said gap, and a third section at said first border of said second filter media panel element;
said second endwall portion has a first section at said second border of said first filter media panel element, a second section spanning said gap, and a third section at said second border of said second filter media panel element.

19. The fixture according to claim 15 wherein said base portion of said fixture has ramped interface surfaces.

20. A system for filtering fluid, comprising:
a housing; and
a V-shaped filter assembly positioned within the housing, the V-shaped filter assembly comprising:
a pair of filter media panel elements having respective facing root ends and diverging therefrom to distal ends in a V-shape; and
a single unitarily molded fixture securing said pair of filter media panel elements in said V-shape,
wherein said fixture lies in a coordinate system having X, Y and Z axes orthogonal to each other, said fixture has a base portion at said distal ends of said filter media panel elements, said base portion having a central opening passing fluid therethrough, said fixture has a pair of endwall portions spaced from each other along the Y-direction, each said endwall portion extending in the Z-direction from said base portion, each said endwall portion lying in an X-Z plane, a first of said filter media panel elements lying in a first oblique plane oblique to each of an X-Y plane and a Y-Z plane, a second of said filter media panel elements lying in a second oblique plane oblique to each of the X-Y and Y-Z planes, said first and second oblique planes intersecting at an intersection line extending in the Y-direction, said fixture has a first lattice-work portion through which fluid flows, said first lattice-work portion lying in said first oblique plane and extending from said base portion towards said intersection line, said fixture has a second lattice-work portion through which fluid flows, said second lattice-work portion lying in said second oblique plane and extending from said base portion towards said intersection line.

* * * * *